(12) United States Patent
Killop (10) Patent No.: US 6,250,123 B1
(45) Date of Patent: Jun. 26, 2001

(54) METHOD, APPARATUS AND RACK FOR MAKING POWER TRANSMISSION MEMBER

(75) Inventor: James Thomas Killop, Macomb Township, Macomb County, MI (US)

(73) Assignee: Utica Enterprises, Inc., Shelby Township, MI (US)

( * ) Notice: Subject to any disclaimer, the term of this patent is extended or adjusted under 35 U.S.C. 154(b) by 0 days.

(21) Appl. No.: 09/399,447

(22) Filed: Sep. 20, 1999

(51) Int. Cl.[7] ....................................................... B21H 5/00
(52) U.S. Cl. .................................................. 72/88; 72/469
(58) Field of Search ................................. 72/88, 90, 469, 72/111, 102

(56) References Cited

U.S. PATENT DOCUMENTS

| | | | |
|---|---|---|---|
| 446,932 | * | 2/1891 | Simonds ................................. 72/88 |
| 4,644,772 | | 2/1987 | Killop et al. ............................. 72/88 |
| 4,689,980 | | 9/1987 | Killop et al. ............................. 72/88 |

FOREIGN PATENT DOCUMENTS

348504 * 8/1982 (RU) ....................................... 72/88

\* cited by examiner

Primary Examiner—Daniel C. Crane
(74) Attorney, Agent, or Firm—Brooks & Kushman P.C.

(57) ABSTRACT

A power transmission member (20) is provided by a spline rolling method and apparatus (36) that includes a pair of racks (38) for providing splines (24) with ends (34) opposing each other in a precisely spaced relationship at an annular groove (30) that is utilized to provide snap ring or other fastener positioning for axially locating the member during use.

14 Claims, 5 Drawing Sheets

METHOD, APPARATUS AND RACK FOR MAKING POWER TRANSMISSION MEMBER

TECHNICAL FIELD

This invention relates to a power transmission member having opposed spline ends at an annular groove such as for holding a snap ring, and the invention also relates to a method, apparatus and a rack for splining the power transmission member.

BACKGROUND ART

Snap ring grooves have previously been formed in splined power transmission members by material removal such as grinding. Furthermore, U.S. Pat. Nos. 4,644,772 Killop et al. and 4,689,980 Killop et al. disclose toothed racks that have elongated blade members with a progressively increasing height for deforming a workpiece to form the entirety of an annular groove with a uniform cross-section. Such forming necessarily exerts significant pressure on the elongated blade members and results in wear that can require early replacement of the associated toothed racks.

DISCLOSURE OF INVENTION

An object of the present invention is to provide an improved method for rolling splines having opposed ends that are spaced from each other at an annular groove in a workpiece whose processing provides the previously described power transmission member.

In carrying out the above object, the method for rolling splines in accordance with the invention is performed by rotatably supporting about a rotational axis a workpiece having an annular groove with an annular root surface and with side walls that are spaced from each other. The workpiece is engaged on opposite sides with a pair of racks that are moved in opposite directions as each other and that have teeth for rolling the splines in the workpiece and with each rack having an elongated die that is received within the annular groove in the workpiece and that has side surfaces spaced from each other slightly less than the spacing between the side walls of the annular groove such that spline ends are formed against the side surfaces of the elongated dies in an opposed and precisely located relationship at the outer extremity of the annular groove in the workpiece and with the side walls of the annular groove inwardly from the spline ends being spaced slightly farther from each other than the spacing of the spline ends from each other.

In the preferred practice of the method, the workpiece is initially allowed to axially float along the rotational axis to facilitate alignment of the elongated dies of the racks with the annular groove of the workpiece, and the workpiece is subsequently axially fixed along the rotational axis during the spline rolling.

The preferred practice of the method for spline rolling a workpiece also has a tip of each elongated die engaged with the annular root surface of the annular groove during the spline rolling to provide work hardening thereof that provides strengthening.

The rotational support of the workpiece during the spline rolling is between headstock and tailstock centers which are initially positioned to allow the workpiece to axially float along the rotational axis and are subsequently provided with relative axial movement toward each other to axially fix the workpiece along the rotational axis during the spline rolling and forming of the spline ends at the annular groove in the workpiece.

Another object of the present invention is to provide improved apparatus for rolling splines having opposed ends that are spaced from each other at an annular groove in a workpiece.

In carrying out the immediately preceding object, headstock and tailstock centers rotatably support about a rotational axis a workpiece having an annular groove with an annular root surface and with side walls spaced from each other. A pair of racks of the apparatus are moved in opposite directions as each other and have teeth for rolling splines in the workpiece. Each rack has an elongated die that is received within the annular groove as the splines are rolled. Each elongated die has side surfaces spaced from each other slightly less than the spacing between the side walls of the annular groove such that spline ends are formed against the side surfaces of the elongated dies in an opposed and precisely located relationship at the outer extremity of the annular groove in the workpiece and with the side walls of the annular groove inwardly from the spline ends being spaced slightly farther from each other than the spacing of the spline ends from each other.

Headstock and tailstock positioners initially position the headstock and tailstock centers to allow the workpiece to axially float along the rotational axis to facilitate initial alignment movement of leading ends of the elongated dies into the annular groove of the workpiece. The headstock and tailstock positioners subsequently provide relative movement between the headstock and tailstock centers toward each other to axially fix the workpiece along the rotational axis as the spline rolling is performed. The elongated dies may have tips that engage the annular root surface of the annular groove during the spline rolling to provide work hardening that provides strengthening.

Another object of the present invention is to provide an improved rack for rolling splines having opposed ends that are spaced from each other at an annular groove in a workpiece.

In carrying out the immediately preceding object, the spline rolling rack according ion includes teeth for rolling the splines in the workpiece on opposite sides which has an annular root surface and side walls spaced from each other. An elongated die of the rack is received within the annular groove as the splines are rolled. The elongated die has side surfaces that are spaced from each other slightly less than the spacing between the side walls of the annular groove such that spline ends are formed against the side surfaces of the elongated dies in an opposed and precisely located relationship at the outer extremity of the annular groove in the workpiece and with the side walls of the annular groove inwardly from the spline ends being spaced slightly farther from each other than the spacing of the spline ends from each other. The elongated die has leading and trailing ends and has a flat tip that extends between the side surfaces in a perpendicular relationship to the side surfaces for the entire extent between the leading and trailing ends.

In the preferred construction of the rack, the elongated die has a tapered leading end that projects forwardly from the teeth to provide the initial alignment of the workpiece and the elongated die of the rack.

In its preferred construction, the rack includes a pair of elongated rack portions each of which has spaced tooth portions. The elongated die of the rack includes an elongated die member positioned between the pair of elongated rack portions and projecting therefrom so as to be received within the annular groove in the workpiece during the spline rolling. A connection of the rack secures the pair of elongated rack portions to each other with the elongated die member therebetween in a secured relationship.

In the preferred construction of the rack, the elongated die has a tip that engages the annular root surface of the annular groove to provide work hardening that provides strengthening.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
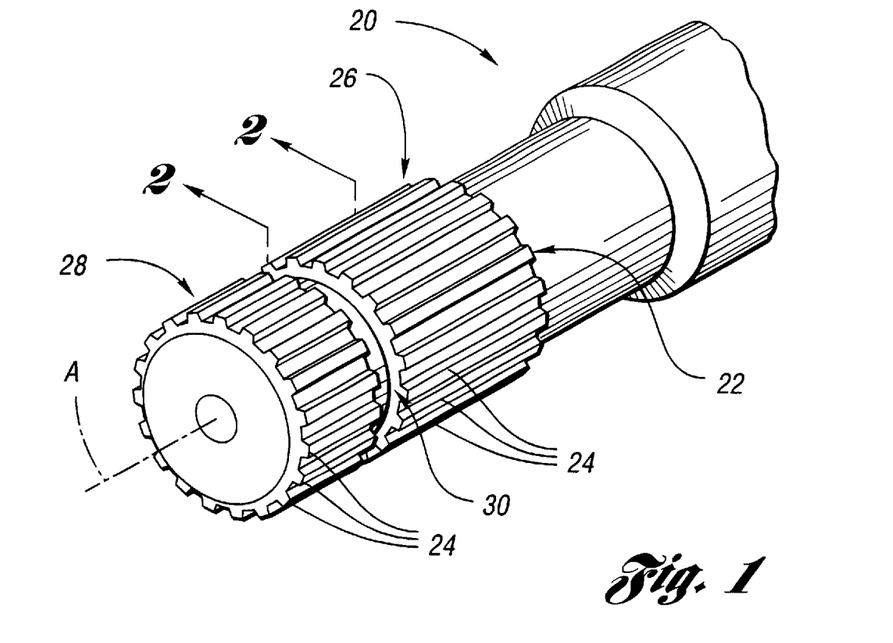
FIG. 1 is a perspective view of a power transmission member that has splines rolled with ends that oppose each other at an annular groove in accordance with the present invention.
Figure 2:
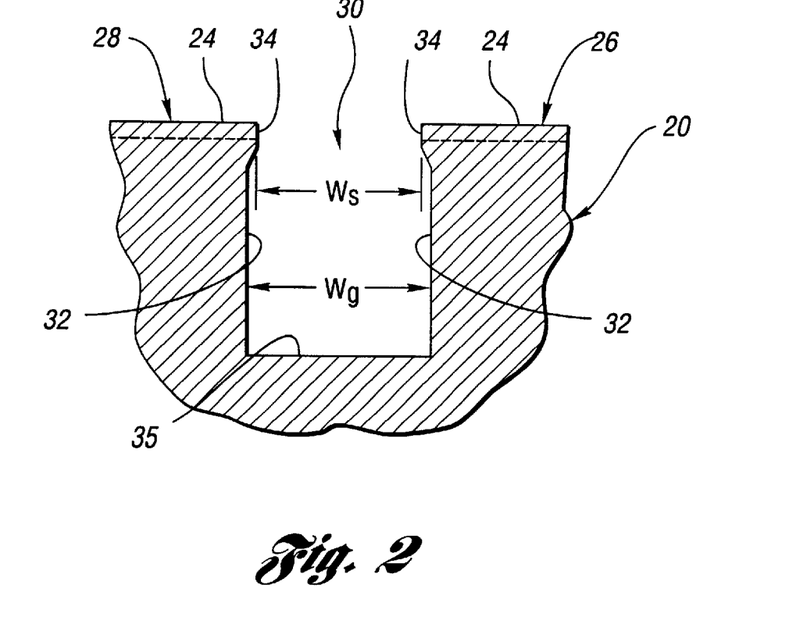
FIG. 2 is a partial sectional view taken through the power transmission member along the direction of line 2—2 in FIG. 1 to illustrate the cross-section of the annular groove in relationship to the opposed spline ends.

With reference to FIG. 1 of the drawings, a power transmission member for transmitting torque is generally indicated by 20 and includes a generally round unitary shaft 22 having a rotational axis A and rolled splines 24 provided on an inward end portion 26 and a terminal end portion 28 of the shaft 22. An annular groove 30 in the shaft 22 is located between the inward and terminal end portions 26 and 28 with the splines 24 located on opposite sides thereof along the rotational axis A. The annular groove 30 as best illustrated in FIG. 2 has side surfaces 32 that are spaced from each other along the rotational axis of the shaft by a width Wg. The splines 24 have ends 34 that oppose each other at the annular groove 30 and that are spaced from each other by a width Ws that is slightly less than the spacing between the side surfaces 32 of the groove. These spline ends 34 may function to provide positioning of a snap ring or other locator that is utilized to axially position the power transmission member 20 along the rotational axis A during use.

In the preferred construction of the power transmission member 20 illustrated in FIGS. 1 and 2, the ends 34 of the splines 24 are spaced from each other by a width Ws in the range of 0.02 to 0.010 of an inch (i.e., 0.005 to 0.025 of a centimeter) less than the spacing of the width Wg between the side surfaces 32 of the annular groove.

It is also most preferable that the annular groove 30 have an annular root surface 35 that is work hardened to provide strengthening that prevents breakage of the terminal end 28 of the power transmission member upon loading.

Figure 3:
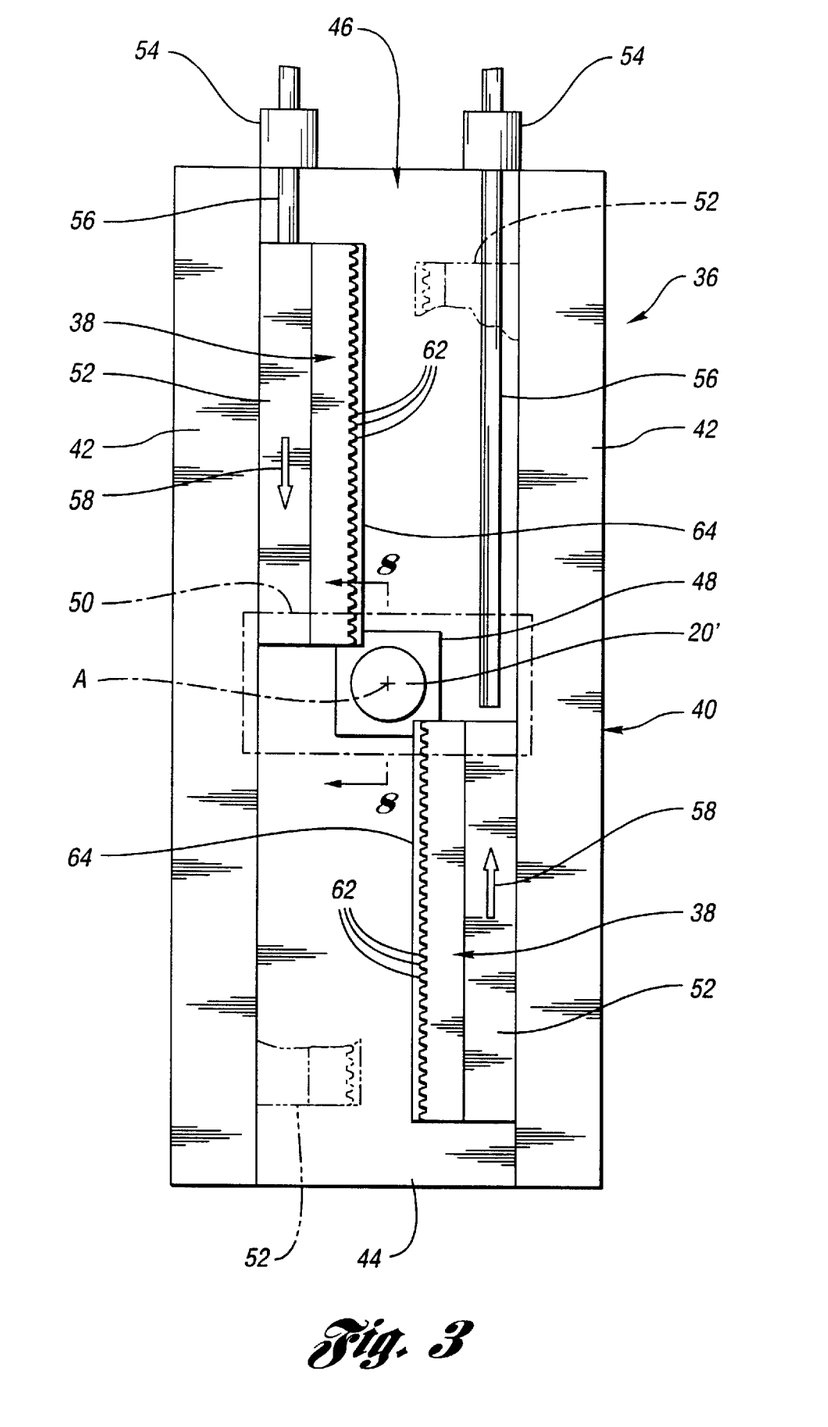
FIG. 3 is an elevational view of apparatus constructed in accordance with the invention to perform the method thereof for rolling the splines in the workpiece.
Figures 4, 5:
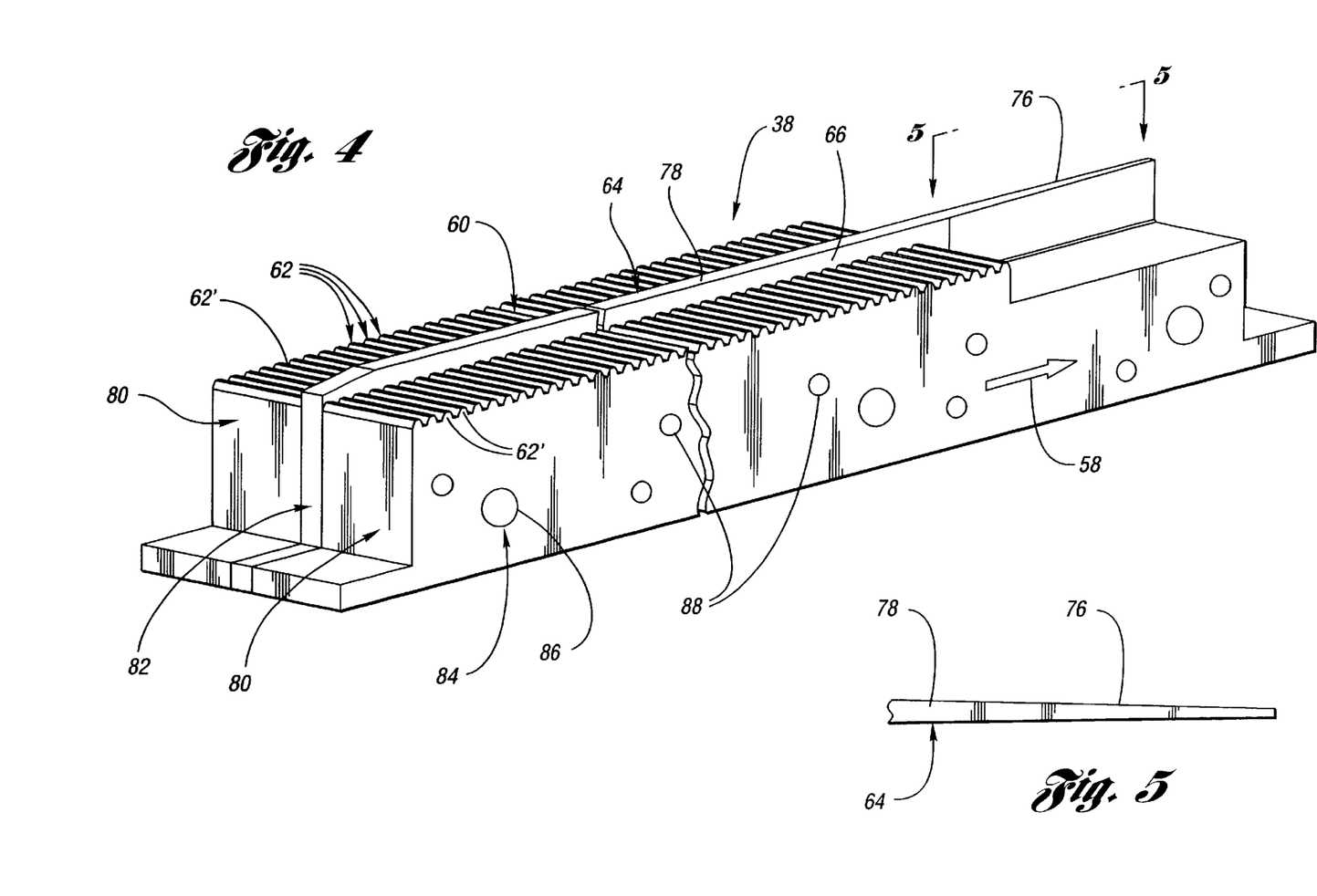
FIG. 4 is a perspective view of the construction of a rack utilized in the method by the apparatus to roll the splines in accordance with the invention.
FIG. 5 is a partial top plan view taken along the direction of line 5—5 in FIG. 4 to illustrate a tapered leading end of an elongated die of the apparatus.
Figure 6:
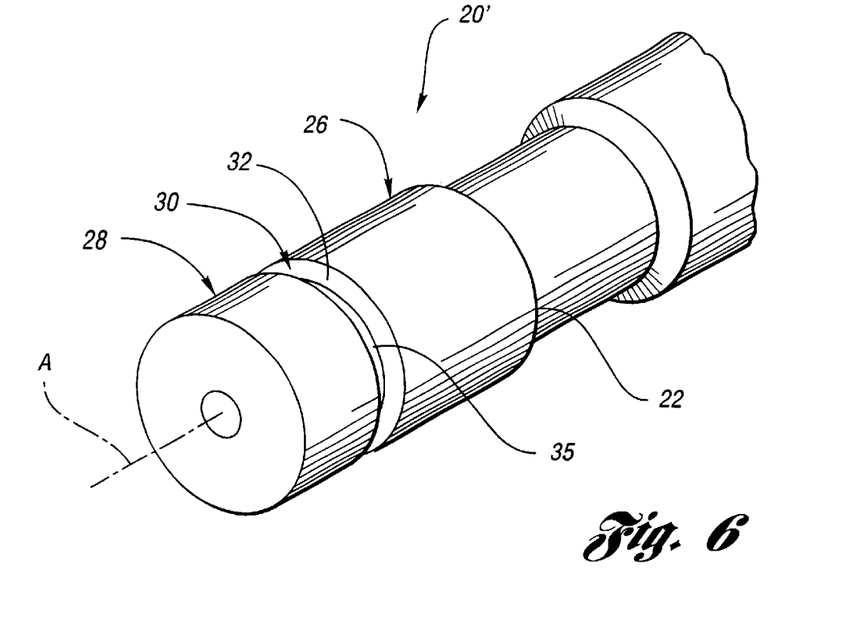
FIG. 6 is a perspective view similar to FIG. 1 illustrating a workpiece in which the splines are rolled to provide the power transmission member.

The splined power transmission member 20 described above in connection with FIGS. 1 and 2 is manufactured on apparatus 36 that is illustrated in FIG. 3 and performs the method of the invention as is hereinafter more fully described. This apparatus 36 incorporates a pair of toothed forming racks 38 whose construction is illustrated in FIGS. 4 and 5 and which also involves another aspect of the present invention. A pair of the forming racks 38 utilized within the apparatus 36 as is hereinafter more fully described operates on a workpiece 20' as illustrated in FIG. 6 to provide spline rolling in a manner that is further illustrated in FIGS. 7–10.

With reference to FIG. 3, the method for spline rolling in accordance with the invention, the apparatus 36 for performing the method and the construction of the racks 38 will be described in an integrated manner to facilitate an understanding of the different aspects of the invention. Apparatus 36 includes a vertically extending base 40 that has a pair of forwardly extending base portions 42 extending from a rear base portion 44 to define a workspace 46. The workpiece 20' is rotatably supported along the rotational axis A within the workspace 46 by a headstock 48 and a tailstock 50 that will be hereinafter more fully described in connection with FIGS. 8–10. A pair of the racks 38 that are constructed as illustrated in FIG. 4 are supported as shown in FIG. 3 by a pair of slides 52 movable along the base portions 42 on opposite sides of the workpiece 20'. A pair of actuators 54 mounted on the upper end of the base 40 have connectors 56 that extend downwardly to the pair of slides 52 to provide vertical movement thereof for the spline forming. The slides 52 are moved in the opposite directions of each other as shown by arrows 58 for the spline rolling, such that the lower right forming rack 38 is moved upwardly on the right side of the workpiece 20' and the upper left rack 38 is moved downwardly on the left side of the workpiece 20'.

For a more complete understanding of the machine construction of the apparatus 36 illustrated in FIG. 3, reference should be had to U.S. Pat. No. 5,970,768 Killop et al.; U.S. Pat. No. 5,983,690, Killop et al.; and U.S. Pat. No. 5,987,953 Killop et al., the entire disclosures of which are hereby incorporated by reference.

Figure 11:
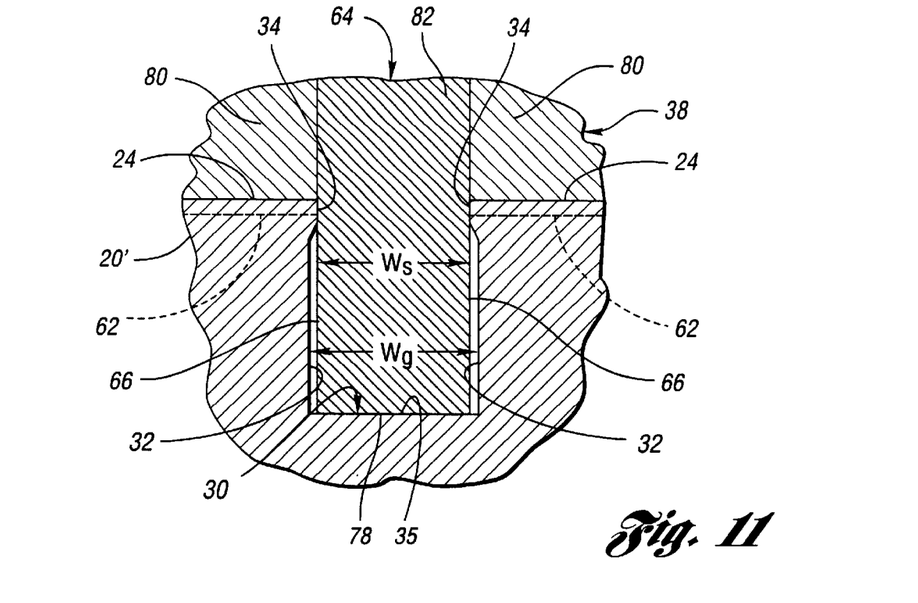
FIG. 11 is a view taken in the same direction as FIG. 2 to illustrate the manner in which the spline ends are rolled against side surfaces of the elongated die of each rack.

With combined reference to FIGS. 3 and 4, each of the racks 38 has an elongated shape along the direction it is moved as illustrated by arrow 58. A forming face 60 of each rack 38 includes teeth 62 that are spaced along the direction of movement of the rack and extend generally transversely thereto to provide roll forming of the splines in the workpiece as previously described. Each rack 38 also includes an elongated die 64 that projects from the forming face 60 intermediate the ends of the teeth at each lateral side of the rack. The elongated die 64 as illustrated in FIG. 11 is received within the annular groove 30 in the workpiece during the rolling of the splines and has side surfaces 66 that face away from each other in a parallel relationship. The side surfaces 66 of the elongated die 64 are spaced from each other by a width Wd that is slightly less than the spacing by the width Wg between the side walls 32 of the annular groove 30 in the workpiece. As such, the pressure exerted on the workpiece by the rack teeth 62 to form the splines 24 forces the material against the side surfaces 66 of the elongated die adjacent the splines at the outer radial extremity of the annular groove 30 to form the spline ends 34. The spline ends 34 thus are precisely located with respect to each other to provide positioning of an associated fastener or snap ring that is utilized with the splined power transmission member. More specifically, the spacing Wd between the side surfaces 66 of the elongated die 64 is in the range of 0.002 to 0.010 of an inch (i.e., 0.005 to 0.025 of a centimeter) less than the spacing Wg between the side walls 32 of the annular groove 30. As such, the spline ends 34 at the outer extremity of the annular groove 30 are spaced from each other that same distance less than the spacing between the side walls 32 of the annular groove inwardly from the spline ends.

Figure 7:
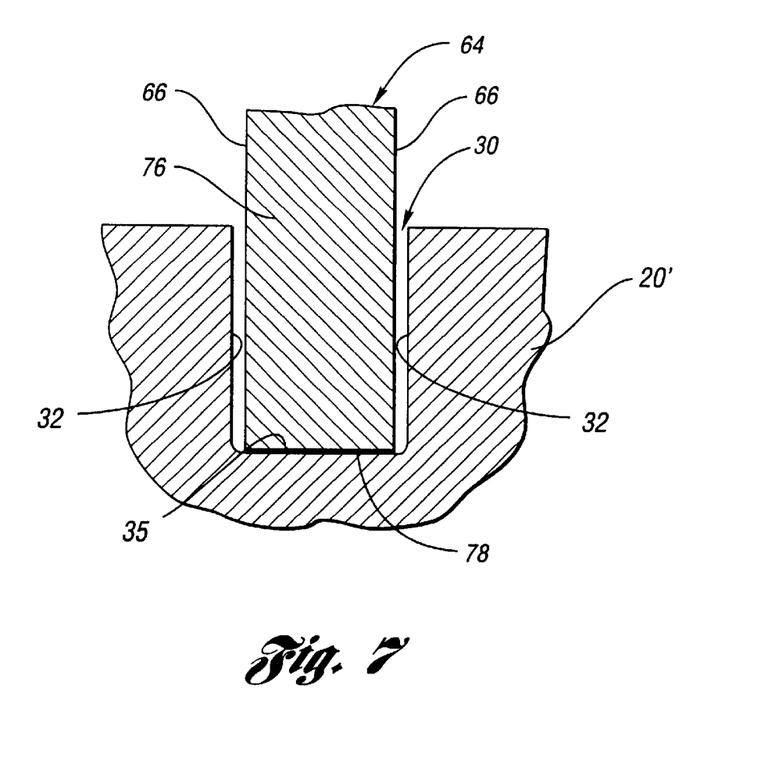
FIG. 7 is a sectional view taken in the same direction as FIG. 2 to illustrate the manner in which the elongated die of the rack is initially received within the annular groove to provide alignment.
Figure 8:
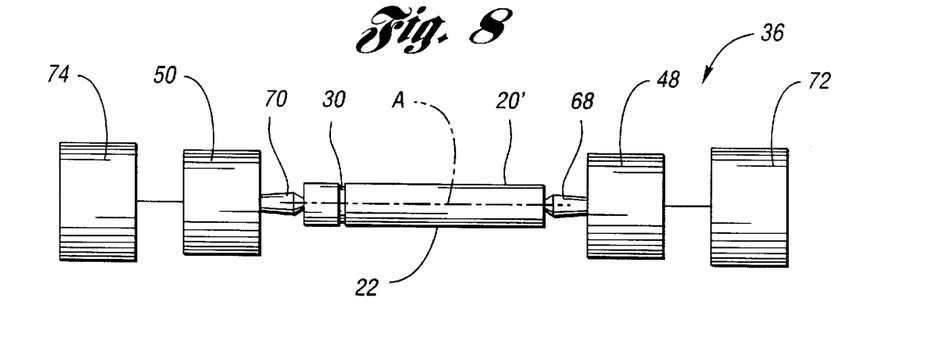
FIG. 8 is a view that illustrates headstock and tailstock centers that rotatably support the workpiece along a rotational axis for the spline rolling.
Figure 9:
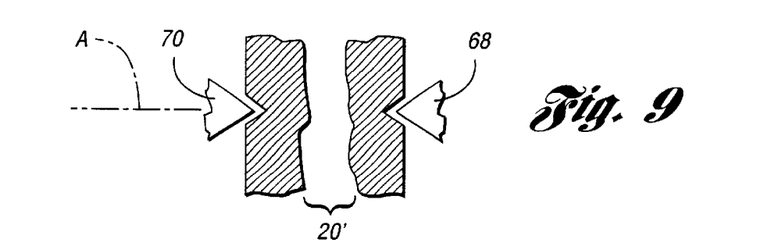
FIG. 9 is a partial schematic view taken on an enlarged scale from FIG. 8 to illustrate the manner in which the headstock and tailstock centers allow the workpiece to axially float along the rotational axis during the initial alignment with the pair of racks utilized to provide the splining.
Figure 10:
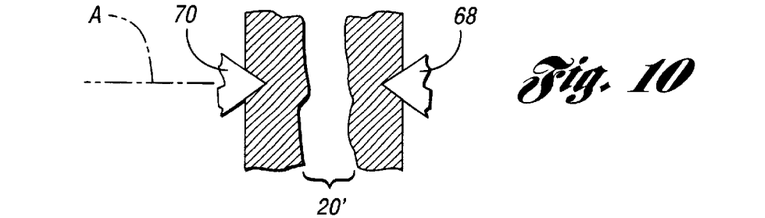
FIG. 10 is a view similar to FIG. 9 but showing the manner in which relative movement between the headstock and tailstock centers toward each other axially fixes the workpiece along the rotational axis during the spline rolling.

The workpiece 20' illustrated in FIG. 6 is rotatably supported by the apparatus 36 shown in FIG. 3 in a manner that is further illustrated in FIG. 8. Furthermore, as shown in FIG. 8, the headstock 48 and tailstock 50 include associated centers 68 and 70 that rotatably support the workpiece 20' along the rotational axis A. The apparatus 36 includes a headstock positioner 72 that axially positions the headstock 48 and its associated center 68 along the rotational axis A, and the apparatus also includes a tailstock positioner 74 that positions the tailstock 50 and its associated center 70 along the rotational axis A. During the initial portion of each spline rolling cycle, the headstock and tailstock positioners 72 and 74 position the headstock and tailstock centers 68 and 70 as shown in FIG. 9 so as to permit the workpiece 20' to axially float along the rotational axis A. Furthermore, as illustrated in FIGS. 4, 5 and 7, the elongated die 64 of each forming rack 38 has a tapered leading end 76 that projects forwardly from the teeth 62 and is initially received within the annular groove 30 of the workpiece 20' to provide alignment of each rack with the workpiece along the rotational axis A as it is allowed to axially float therealong as shown in FIG. 9. After such initial alignment, the headstock and tailstock positioners 72 and 74 provide movement of the headstock 48 and tailstock 50 so that their associated centers 68 and 70 axially fix the workpiece 20' along the rotational axis A as shown in FIG. 10. Thereafter, continued movement of the racks 38 in opposite directions as each other as shown by the arrows 58 in FIG. 3 provides the rolling of the splines and formation of the spline ends 34 with the spacing previously described in connection with FIG. 11. After each cycle of spline rolling, the formed power transmission member 20 is removed from between the headstock and tailstock and the rack slides 52 are moved by the slide actuators 54 from their partial phantom line indicated positions shown in FIG. 3 back to their original positions shown by solid line representation so as to then be ready for the next cycle.

As shown by combined reference to FIGS. 4, 5 and 11, the elongated die 64 of each rack 38 preferably has leading and trailing ends and has a flat tip 78 that extends between the side surfaces 66 in a perpendicular relationship to the side surfaces for the entire extent between the leading and trailing ends. The flat die tip 78 engages the annular root surface 35 of the annular groove 30 during the spline rolling to provide work hardening thereof that provides strengthening. This strengthening of the annular root surface 35 as previously mentioned prevents the terminal end portion 28 of the power transmission member illustrated in FIG. 1 from breaking off at the annular groove 30. The die member tip 78 projecting from the forming face 60 of rack 38 will have a slightly upwardly inclined orientation from the leading end of the rack toward its trailing end so the work hardening will be progressive.

As illustrated in FIG. 4, each rack 38 has a preferred construction including a pair of elongated rack portions 80 each of which has spaced tooth portions 62'. The elongated die 64 of each rack 38 includes an elongated die member 82 positioned between the pair of elongated rack portions 80 and projecting therefrom so as to provide the spline end forming previously described as well as preferably also providing the work hardening of the annular root surface as also previously described. A connection collectively indicated by 84 includes connectors 86 as well as alignment pins 88 that secure and properly align the pair of rack portions 80 and the elongated die member 82.

It should be noted that the spline roll while illustrated with axially extending splines can also be performed to provide splines with a helical twist.

While the best mode for carrying out the invention has been described in detail, those familiar with the art to which this invention relates will recognize various alternative designs and embodiments for practicing the invention as defined by the following claims.

What is claimed is:

1. A method for rolling splines having opposed ends that are spaced from each other at an annular groove in a workpiece, comprising:

rotatably supporting about a rotational axis a workpiece having an annular groove with an annular root surface and with side walls spaced from each other; and engaging the workpiece on opposite sides with a pair of racks that are moved in opposite directions as each other and that have teeth for rolling the splines in the workpiece and with each rack having an elongated die that is received within the annular groove of the workpiece and that has side surfaces spaced from each other slightly less than the spacing between the side walls of the annular groove such that spline ends are formed against the side surfaces of the elongated dies in an opposed and precisely located relationship at the outer extremity of the annular groove in the workpiece and with the side walls of the annular groove inwardly from the spline ends being spaced slightly farther from each other than the spacing of the spline ends from each other.

2. A method for rolling splines in a workpiece as in claim 1 wherein the workpiece is initially allowed to axially float along the rotational axis to facilitate alignment of the elongated dies of the racks with the annular groove of the workpiece, and the workpiece subsequently being axially fixed along the rotational axis during the spline rolling.

3. A method for rolling splines in a workpiece as in claim 1 wherein a tip of each elongated die engages the annular root surface of the annular groove during the spline rolling to provide work hardening thereof that provides strengthening.

4. A method for rolling splines having opposed ends that are spaced from each other at an annular groove in a workpiece, comprising:

rotatably supporting between headstock and tailstock centers along a rotational axis a workpiece having an annular groove with an annular root surface and with side walls spaced from each other;

the headstock and tailstock centers initially being positioned to allow the workpiece to axially float along the rotational axis;

moving a pair of racks having teeth in opposite directions as each other to move a leading end of an elongated die of each rack into the annular groove of the workpiece to provide axial positioning thereof along the rotational axis;

subsequently providing relative axial movement of the headstock and tailstock centers toward each other to axially fix the workpiece along the rotational axis; and continuing to move the pair of racks in opposite directions as each other such that the teeth roll splines in the workpiece as an elongated die of each rack is received within the annular groove of the workpiece such that the splines are formed toward the elongated dies against side surfaces thereof that are spaced from each other slightly less that the spacing between the side walls of the annular groove such that spline ends are formed in an opposed and precisely located relationship at the annular groove in the workpiece.

5. A method for rolling splines having opposed ends that are spaced from each other at an annular groove in a workpiece, comprising:

rotatably supporting between headstock and tailstock centers along a rotational axis a workpiece having an annular groove with an annular root surface and with side walls spaced from each other;

the headstock and tailstock centers initially being positioned to allow the workpiece to axially float along the rotational axis;

moving a pair of racks having teeth in opposite directions as each other to move a leading end of an elongated die of each rack into the annular groove of the workpiece to provide axial positioning thereof along the rotational axis;

subsequently providing relative axial movement of the headstock and tailstock centers toward each other to axially fix the workpiece along the rotational axis; and continuing to move the pair of racks in opposite directions as each other such that the teeth roll splines in the workpiece as an elongated die of each rack is received within the annular groove of the workpiece with a tip of each elongated die engaging the annular root surface of the annular groove to provide strengthening of the workpiece and such that the splines are formed toward the elongated dies against side surfaces thereof that are spaced from each other slightly less that the spacing between the side walls of the annular groove such that spline ends are formed in an opposed and precisely located relationship at the annular groove in the workpiece.

6. Apparatus for rolling splines having opposed ends that are spaced from each other at an annular groove in a workpiece, the apparatus comprising:

headstock and tailstock centers for rotatably supporting about a rotational axis a workpiece having an annular groove with an annular root surface and with side walls spaced from each other;

a pair of racks that are moved in opposite directions as each other and that have teeth for rolling the splines in the workpiece, each rack having an elongated die that is received within the annular groove as the splines are rolled, and each elongated die having side surfaces spaced from each other slightly less that the spacing between the side walls of the annular groove such that spline ends are formed against the side surfaces of the elongated dies in an opposed and precisely located relationship at the outer extremity of the annular groove in the workpiece and with the side walls of the annular groove inwardly from the spline ends being spaced slightly farther from each other than the spacing of the spline ends from each other; and headstock and tailstock positioners that initially position the headstock and tailstock centers to allow the workpiece to axially float along the rotational axis to facilitate initial movement of leading ends of the elongated dies into the annular groove of the workpiece, and the headstock and tailstock positioners subsequently providing relative movement of the headstock and tailstock centers toward each other to axially fix the workpiece along the rotational axis as the spline rolling is performed.

7. Apparatus for rolling splines in a workpiece as in claim 6 wherein the elongated dies have tips the engage the annular root surface of the annular groove in the workpiece during the spline rolling to provide work hardening that provides strengthening.

8. A rack for rolling splines having opposed ends that are spaced from each other at an annular groove in a workpiece, the rack comprising:

teeth for rolling the splines in the workpiece on opposite axial sides of the annular groove which has an annular root surface and side walls spaced from each other; and an elongated die that is received within the annular groove as the splines are rolled, the elongated die having side surfaces that are spaced from each other slightly less than the spacing between the side walls of the annular groove such that spline ends are formed against the side surfaces of the elongated dies in an opposed and precisely located relationship at the outer extremity of the annular groove in the workpiece and with the side walls of the annular groove inwardly from the spline ends being spaced slightly farther from each other than the spacing of the spline ends from each other, and the elongated die having leading and trailing ends and having a flat tip that extends between the side surfaces in a perpendicular relationship to the side surfaces for the entire extent between the leading and trailing ends.

9. A rack for rolling splines as in claim 8 wherein the elongated die has a tapered leading end that projects forwardly from the teeth.

10. A rack for rolling splines as in claim 8 which includes a pair of elongated rack portions each of which has spaced tooth portions, the elongated die of the rack includes an elongated die member positioned between the pair of elongated rack portions and projecting therefrom, and a connection that secures the pair of elongated rack portions to each other with the elongated die member therebetween.

11. A rack for rolling splines as in claim 8 wherein the elongated die of the rack has a tip that engages the annular root surface of the annular groove to provide work hardening that provides strengthening.

12. A rack for rolling splines having opposed ends that are spaced from each other at an annular groove in a workpiece, the rack comprising:

a pair of rack portions that have tooth portions for cooperatively providing teeth for rolling the splines in the workpiece on opposite axial sides of the annular groove which has an annular root surface and side walls spaced from each other;

an elongated die located between the pair of rack portions and having a tapered leading end that projects from the teeth to provide alignment of the rack with the annular groove of the workpiece prior to rolling the splines, the elongated die being received within the annular groove as the splines are rolled and having side surfaces that are spaced from each other slightly less than the spacing between the side walls of the annular groove such that spline ends are formed against the side surfaces of the elongated die in an opposed and precisely located relationship at the outer extremity of the annular groove in the workpiece and with the side walls of the annular groove inwardly from the spline ends being spaced slightly farther from each other than the spacing of the spline ends from each other, and the elongated die having leading and trailing ends and having a flat tip that extends between the side surfaces in a perpendicular relationship to the side surfaces for the entire extent between the leading and trailing ends; and a connection that secures the pair of rack portions to each other with the elongated die located therebetween and secured to the rack portions.

13. A rack for rolling splines having opposed ends that are spaced from each other at an annular groove in a workpiece, the rack comprising:

a pair of rack portions that have tooth portions for cooperatively providing teeth for rolling the splines in the workpiece on opposite axial sides of the annular groove which has an annular root surface and side walls spaced from each other;

an elongated die located between the pair of rack portions and having a tapered leading end that projects from the teeth to provide alignment of the rack with the annular groove of the workpiece prior to rolling the splines, the elongated die having a flat tip that engages the annular root surface of the annular groove as the splines are rolled to provide work hardening that provides strengthening, and the elongated die having leading and trailing ends and having side surfaces that are spaced from each other slightly less than the spacing between the side walls of the annular groove such that spline ends are formed against the side surfaces of the elongated die in an opposed and precisely located relationship at the outer extremity of the annular groove in the workpiece and with the side walls of the annular groove inwardly from the spline ends being spaced slightly farther from each other than the spacing of the spline ends from each other and the flat tip extending between the side surfaces in a perpendicular relationship to the side surfaces for the entire extent between the leading and trailing ends; and a connection that secures the pair of rack portions to each other with the elongated die located therebetween and secured to the rack portions.

14. A rack for rolling splines having opposed ends that are spaced from each other at an annular groove in a workpiece, the rack comprising:

a pair of rack portions that have tooth portions for cooperatively providing teeth for rolling the splines in the workpiece on opposite axial sides of the annular groove which has an annular root surface and side walls spaced from each other;

an elongated die located between the pair of rack portions and having a tapered leading end that projects from the teeth to provide alignment of the rack with the annular groove of the workpiece prior to rolling the splines, the elongated die being received within the annular groove as the splenes are rolled and having side surfaces that are spaced from each other slighty less than the spacing between the side walls of the annular groove such that spline ends are formed against the side surfaces of the elongated die in an opposed and precisely located relationship at the outer extremity of the annular groove in the workpiece and with the side walls of the annular groove inwardly from the spline ends being spaced slightly farther from each other than the spacing of the spline ends from each other, the elongated die having leading and trailings and having a flat tip that engages the annular root surface of the annular groove as the splines are rolled to provide work hardening that provides strengthening and the flat tip extending between the side surfaces in a perpendicular relationship to the side surfaces for the entire ween the leading and trailing ends; and a connection the pair of rack portions to each other with the elongated die located therebetween and secured to the rack portions.

* * * * *

UNITED STATES PATENT AND TRADEMARK OFFICE
CERTIFICATE OF CORRECTION

PATENT NO. : 6,250,123 B1  Page 1 of 1
DATED : June 26, 2001
INVENTOR(S) : James Thomas Killop et al.

It is certified that error appears in the above-identified patent and that said Letters Patent is hereby corrected as shown below:

<u>Column 10, claim 14,</u>
Line 42, Delete "entire ween" and insert -- entire extent between --.
Line 44, After "a connection" insert -- that secures --.

Signed and Sealed this

Twenty-seventh Day of November, 2001

*Attest:*

*Attesting Officer*

NICHOLAS P. GODICI
*Acting Director of the United States Patent and Trademark Office*